United States Patent Office 3,637,726
Patented Jan. 25, 1972

---

3,637,726
SUBSTITUTED-5-[(3,4-DIHALOPHENOXY)
METHYL]-2-OXAZOLINE COMPOUNDS
Herman Eldridge Faith, Indianapolis, Ind., assignor to
The Dow Chemical Company, Midland, Mich.
No Drawing. Filed Apr. 9, 1970, Ser. No. 27,132
Int. Cl. C07d 85/28
U.S. Cl. 260—307 F      6 Claims

ABSTRACT OF THE DISCLOSURE

Substituted - 5 - [(3,4 - dihalophenoxy)methyl] - 2-oxazoline compounds and their pharmaceutically-acceptable salts, such as 2-amino-5-[(3,4-dichlorophenoxy)methyl]-2-oxazoline and 2-(imino)-5-[3,4-dichlorophenoxy)methxyl]-3-methyl-2-oxazolidine hydrobromide are prepared by the reaction of a substituted 1-amino-3-(3,4-dihalophenoxy)-2-propanol with cyanogen bromide. The novel compounds are useful as antimicrobials for the control of bacteria and fungi.

BACKGROUND OF THE INVENTION

The substituted 1-amino-3(3,4-dihalophenoxy)-2-propanol starting materials useful in the preparation of the compounds of this invention can be prepared by the reaction of ammonia or methylamine with 1,2-epoxy-3-(3,4-dihalophenoxy)propane in a procedure similar to that disclosed by Boyd, J. Chem. Soc. 97, 1791 (1910). See, also, Poos et al., J. Med. Chem. 6, 266 (1963).

SUMMARY OF THE INVENTION

This invention relates to substituted-5-[(3,4-dihalophenoxy)methyl]-2-oxazoline compounds corresponding to the formula

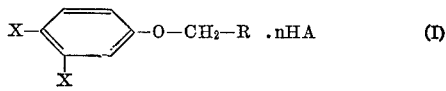

wherein X independently in each occurrence thereof represents chloro or bromo; R represents 2-amino-2-oxazolin-5-yl or 2,3-dihydro-2-imino-3-methyl-2-oxazolin-5-yl; n represents one of the integers zero and one, and HA represents the acid moiety of a non-toxic acid addition salt. The oxazoline compounds of the invention may also be represented as corresponding to one of the formulae

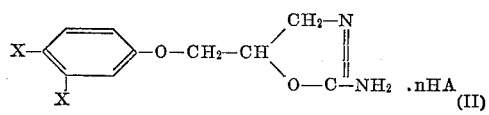

and

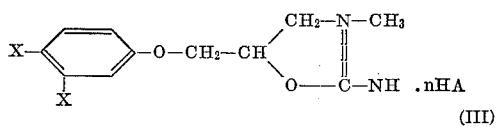

wherein X, n and HA have the significance set out above. The term "non-toxic acid addition salt" as herein employed refers to a salt of a compound of the above formula which is substantially non-toxic and innocuous when such a salt is employed as an antimicrobial agent in the vicinity of animals or desirable plants at application rates consistent with good antimicrobial activity. Such non-toxic acid addition salts include salts with inorganic acids such as hydrochloric, hydrobromic, sulfuric, nitric or phosphoric acid, or with organic acids such as acetic, succinic, toluene-sulfonic, lactic, malic, maleic, tartaric or citric acid.

The compounds of the invention corresponding to Formula I are named as substituted oxazoline compounds while those corresponding to Formula II can be named either as substituted 2,3-dihydro-oxazoline compounds or as substituted oxazolidine compounds. For the sake of convenience, the compounds corresponding to the above formulae will be generically referred to hereinafter as "oxazoline compounds."

The oxazoline compounds of the invention are crystalline solids which are of varying degrees of solubility in aqueous acids and in organic liquids such as ether, alcohols, tetrahydrofuran, chlorinated hydrocarbons, lower alkanes and esters such as ethyl acetate and which are slightly soluble in water. The non-toxic acid addition salts of the oxazoline compounds are crystalline solids which are slightly soluble in benzene and ethers and moderately soluble in water and alcohols.

The oxazoline compounds of the invention have been found to be useful as antimicrobial agents for inhibiting and controlling the growth of fungi including species such as Trichophyton, Candida, Pullularia, Aspergillus, Rhizopus and Cephalosporium, or bacteria, including species such as Aerobacter, Bacillus, Escherichia, Staphylococcus, and Salmonella. Preferred compounds for such use are those corresponding to Formula I above wherein X is the same in both occurrences thereof and wherein R represents 2-amino-2-oxazolin-5-yl (such compounds also corresponding to Formula II). The compound 2-amino-5-[(3,4-dichlorophenoxy)methyl]-2-oxazoline and its non-toxic acid addition salts are particularly preferred.

The novel compounds can be prepared by the reaction of a substituted 1-amino-3-(3,4-dihalophenoxy)-2-propanol corresponding to the formula

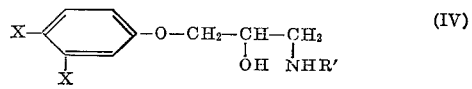

with cyanogen bromide. In the above formula R' represents hydrogen or methyl. The substituted 1-amino-3-(3,4-dihalophenoxy)-2-propanol compounds are conveniently prepared by the reaction of 1,2-epoxy-3-(3,4-dihalophenoxy)-propane with excess ammonia or methylamine. The reaction of the 1,2-epoxy-3-(3,4-dihalophenoxy)-propane with ammonia or methylamine is typically carried out by contacting such reactants in ethanol or methanol as a reaction medium, typically at a temperature of from 40° C. to the boiling point for about 3 to 6 hours.

The reaction of the substituted 1-amino-3-(3,4-dihalophenoxy)-2-propanol with cyanogen bromide proceeds with production of a 2-amino-5-[(3,4-dihalophenoxy)methyl]-2-oxazoline compound corresponding to Formula I wherein R is 2-amino-2-oxazolin-5-yl (the compound thus also corresponding to Formula II) when a 1-amino-3-(3,4-dihalophenoxy)-2-propanol corresponding to Formula IV wherein R' is hydrogen is employed as a starting material. A compound of Formula IV wherein R' is methyl is employed as a starting material when it is desired to obtain an oxazoline compound corresponding to Formula I wherein R is 2,3-dihydro-2-imino-3-methyl-2-oxazolin-5-yl, the compound also corresponding to Formula III.

The reaction proceeds when the reactants are contacted and mixed, tpyically in the presence of an inert organic liquid as a reaction medium, and in the presence of a hydrogen halide acceptor. Representative inert organic liquids which can be employed as reaction media include chloroform, tetrahydrofuran, methylene dichloride ether, methanol, ethanol and ethylene dichloride. Representative hydrogen halide acceptors which can be employed include sodium acetate, sodium carbonate, trimethylamine, triethylamine, pyridine, lutidine and the like. The reaction proceeds at temperatures of from about 0° to about 100° C. and is preferably carried out at a temperature of from about 0° C. to about 30° C. The exact proportions of the reactants to be employed is not critical; however, the reaction consumes the substituted 1-amino-3,(3,4-dihalophenoxy)-2-propanol and the cyanogen bromide reactants in equimolar proportions and the reactants are preferably employed in substantially such proportions. An excess of the hydrogen halide acceptor is preferably employed, generally from about 5 to 15 molar proportions of hydrogen halide acceptor for each molar proportion of cyanogen bromide. The reaction is generally complete in about 1 to about 48 hours depending upon the reaction temperature employed. Salt by-products formed by the reaction of the hydrogen halide of reaction with the hydrogen halide acceptor can be separated from the reaction mixture or from the product by filtration and washing, extraction or the like. The product can also be separated by conventional procedures such as by evaporation under reduced pressure to remove the reaction medium, followed by treatment with an aqueous base such as sodium carbonate or sodium hydroxide and extraction of resulting aqueous mixture with a halogenated hydrocarbon solvent. The separated material can be purified by recrystallization, extraction, washing, or other conventional procedures. Alternately, the product can be converted to a non-toxic acid addition salt and purified in the form of the salt.

The non-toxic acid addition salts of the oxazoline compounds are conveniently prepared by dissolving the free base compound in a solvent such as methanol, ethanol or ether and thereafter adding an excess of a suitable acid such as hydrochloric, hydrobromic, sulfuric, malic, maleic or citric acid or the like. Ether is then added until precipitation of the salt product is complete. The reaction is conveniently carried out at room temperature. The product can be separated by conventional procedures such as evaporation, filtration or centrifugation and purified by conventional procedures such as recrystallization.

The free base oxazoline compounds can be prepared from the salts by mixing the salt or a solution of the salt in a minimal amount of methanol with an excess of an aqueous base such as sodium hydroxide, potassium hydroxide or sodium carbonate. The free base oxazoline compound can be separated by conventional procedures such as extraction with an organic solvent such as benzene, ether, or a chlorinated hydrocarbon solvent. The free base can be purified by conventional procedures such as recrystallization or it can be converted to a non-toxic acid addition salt.

DESCRIPTION OF THE PREFERRED EMBODIMENTS

The following example is illustrative of the invention but is not intended to limit the same.

EXAMPLE

Cyanogen bromide (3.5 grams; 0.03 mole) is dissolved in 5 milliliters of methanol. The solution is added portionwise over a 15 minute period to a solution of 3-amino-1-(3,4 - dichlorophenoxy) - 2-propanol (7.1 grams; 0.03 mole) and 7.4 grams of sodium acetate in 100 milliliters of methanol. During the addition the mixture is maintained at a temperature of 15°–20° C. The mixture is stirred at a temperature of 20° C. for one hour, and stirred at room temperature (about 25° C.) for 18 hours. The mixture is evaporated under reduced pressure and the residue is taken up in aqueous 2 Normal sodium hydroxide solution. The aqueous basic mixture is extracted with chloroform three times, and the chloroform extracts are combined, dried with anhydrous sodium carbonate, and evaporated under reduced pressure. The 2-amino-5-[(3,4 - dichlorophenoxy)methyl]-2-oxazoline free base product is obtained as a residue from the evaporation. The product is dispersed in a small amount of methanol and the methanol solution is mixed with excess hydrogen chloride followed by diethyl ether until precipitation of the hydrochloride salt products is complete. The 2-amino-5 - [(3,4 - dichlorophenoxy)methyl]-2-oxazoline hydrochloride product is obtained as a white crystalline solid which is found to melt at a temperature of 156°–157° C. The structure of the product is confirmed by nuclear magnetic resonance analysis, infrared spectroscopy and elemental analysis.

In a similar procedure, eyquimolar proportions of cyanogen bromide and 1-methylamino-3-(3,4-dichlorophenoxy) - 2 - propanol are reacted together to obtain 5-[(3,4-dichlorophenoxy)-methyl]-2,3-dihydro-2 - imino-3 - methyl - 2-oxazoline, having a molecular weight of 275, as a product. The product can also be named as 5-[(3,4-dichlorophenoxy)methyl] - 2 - imino - 3-methyl-2-oxazolidine.

In a procedure similar to that described above, equimolar proportions of cyanogen bromide and 1-amino-3-(3,4-dibromophenoxy)-2-propanol are reacted together, and the free base oxazoline compound is treated with excess maleic acid to obtain 2-amino-5-[(3,4-dibromophenoxy)methyl]-2-oxazoline maleate, having a molecular weight of 466, as a product.

In a similar procedure 2-amino-5[(3,4-chloro-4-bromophenoxy)methyl]-2-oxazoline, is prepared by the reaction of 1-amino-3-(3-chloro - 4 - bromophenoxy)-2-propanol with cyanogen bromide.

In employing the compounds of the invention in the control of microorganisms such as bacteria and fungi, an antimicrobial amount of one or more of the compounds is applied to the organisms, their habitats or to substrates subject to microbial attack. The antimicrobial amount of oxazoline compound to be employed can vary depending upon such factors as the particular compound or compounds employed, the organisms to be controlled, the type of application involved and the type of antimicrobial effect desired. Useful antimicrobial activity can be obtained by contacting the microbial organisms or substrates subject to microbial attack with an antimicrobial concentration of from about 10 or less to about 500 to 1000 to about 5000 parts by weight of oxazoline compound per million parts by weight of ultimate treating composition. The compounds can be applied by conventional procedures such as dusting, drenching, impregnation, spraying, or the like. They can be formulated by conventional procedures to provide antimicrobial compositions by admixture of one or more oxazoline compounds of the invention with an adjuvant such as surface active dispersing agents, inert liquid carrier, finely divided solid carriers, and the like. The oxazoline compounds can also be formulated as concentrate compositions adapted to be diluted by the addition of inert diluents to prepare ultimate treating compositions.

In other represestative operations, 2-amino-5-[(3,4-dichlorophenoxy)methyl]-2-oxazoline hydrochloride is dispersed in an appropriate bacterial or fungal nutrient agar medium in the amount of 500 parts of said compound per million parts of ultimate composition (by weight). The agar is inoculated with bacterial or fungal test organism, incubated under conditions conductive to microbial growth and examined. Excellent inhibition and control of *Staphylococcus aureus, Candida albicans, Candida pelliculosa, Aerobacter aerogenes, Salmonella typhosa, Mycobacterium phlei, Rhizopus nigricans, Bacillus subtilis, Escherichia coli, Aspergillus terreus,* and *Pullularia pullulans* is obtained in such operations.

What is claimed is:

1. A member of the group consisting of compounds corresponding to the formula

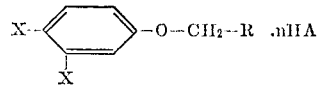

wherein X independently in each occurrence thereof represents chloro or bromo, R represests 2-amino-2-oxazolin-5-yl or 2,3-dihydro-2-imino-3-methyl-2-oxazolin-5-yl; $n$ represents one of the integers zero and one and HA represents the acid moiety of a non-toxic acid addition salt.

2. A compound of claim 1 wherein R represents 2-amino-2-oxazolin-5-yl.

3. A compound of claim 1 wherein X represents chloro in both occurrences thereof.

4. A compound of claim 3 wherein R represents 2-amino-2-oxazolin-5-yl.

5. A compound of claim 1 wherein the compound is 2-amino-5-[(3,4-dichlorophenoxy)methyl]-2-oxazoline.

6. A compound of claim 1 wherein the compound is 2-amino-5-[(3,4 - dichlorophenoxy)methyl-2-oxazoline hydrochloride.

References Cited

Poos et al. C.A. 59, 1610–1611 (1963)—abstract of J. Med. Chem. 6, 266–72 (1963).

ALTON D. ROLLINS, Primary Examiner

R. V. RUSH, Assistant Examiner

U.S. Cl. X.R.

424—272

PO-1050
(5/69)

UNITED STATES PATENT OFFICE
CERTIFICATE OF CORRECTION

Patent No. 3,637,726      Dated    25 January 1972

Inventor(s)    Herman Eldridge Faith

It is certified that error appears in the above-identified patent and that said Letters Patent are hereby corrected as shown below:

Column 1, formula (III), from lines 55 to 60, change the double bond to a single bond between "N" and "C" as follows:

Signed and sealed this 11th day of July 1972.

(SEAL)
Attest:

EDWARD M. FLETCHER, JR.      ROBERT GOTTSCHALK
Attesting Officer      Commissioner of Patents